April 10, 1951     W. TYDON     2,548,832
COMBINED LANDING GEAR DOOR AND FLUID FOIL
Filed Sept. 17, 1948     2 Sheets-Sheet 1
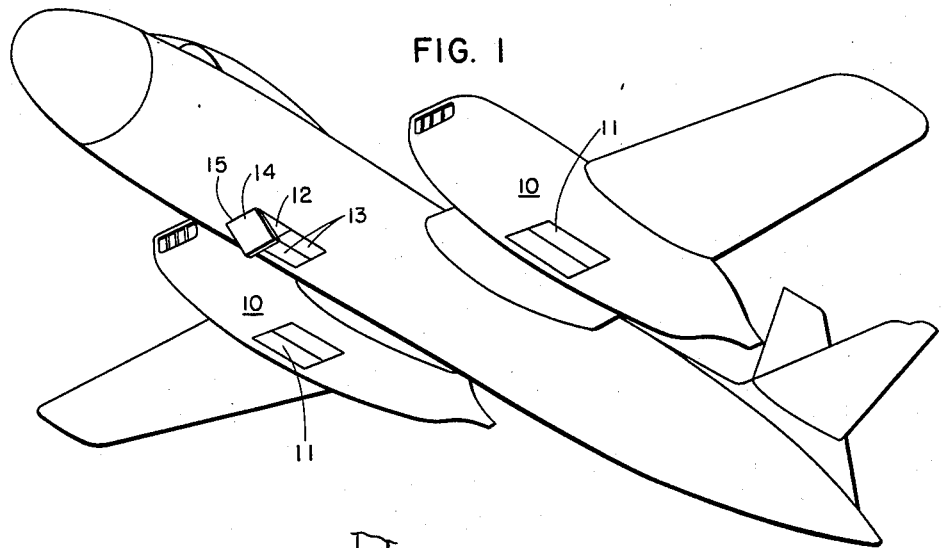
FIG. 1
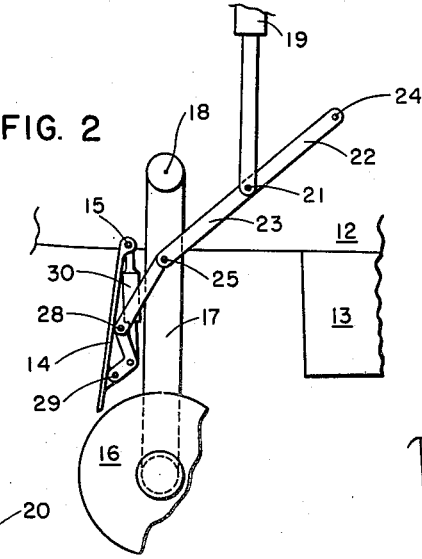
FIG. 2
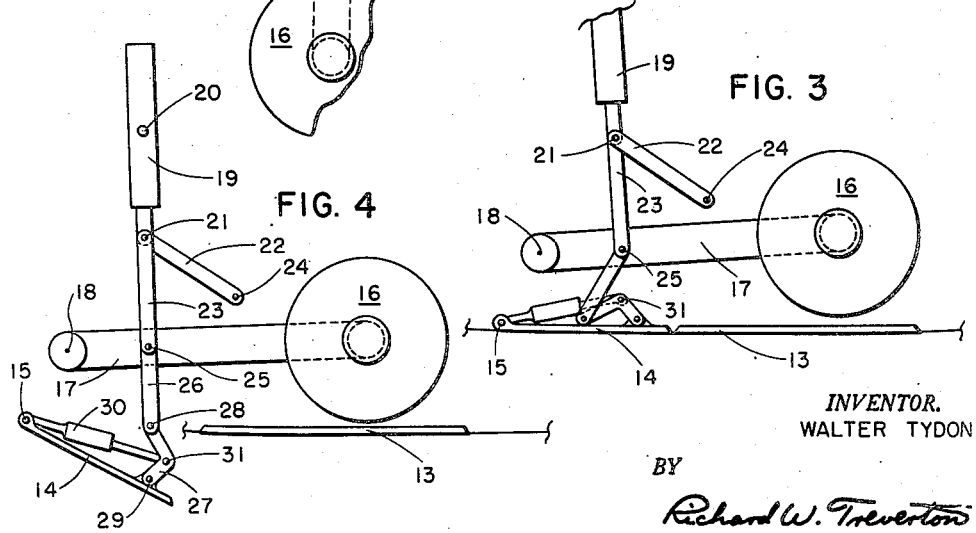
FIG. 3
FIG. 4
INVENTOR.
WALTER TYDON
BY
Richard W. Treverton
ATTORNEY.

April 10, 1951  W. TYDON  2,548,832
COMBINED LANDING GEAR DOOR AND FLUID FOIL
Filed Sept. 17, 1948  2 Sheets-Sheet 2
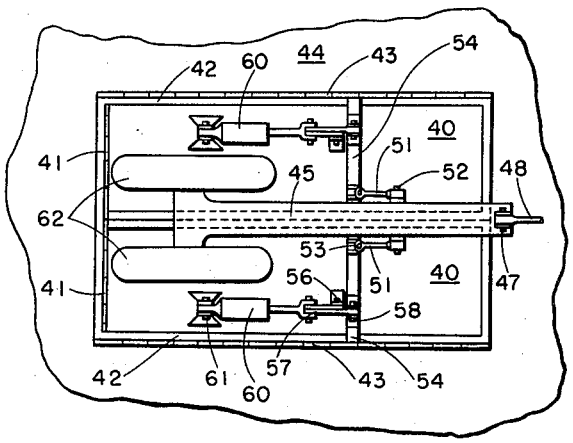
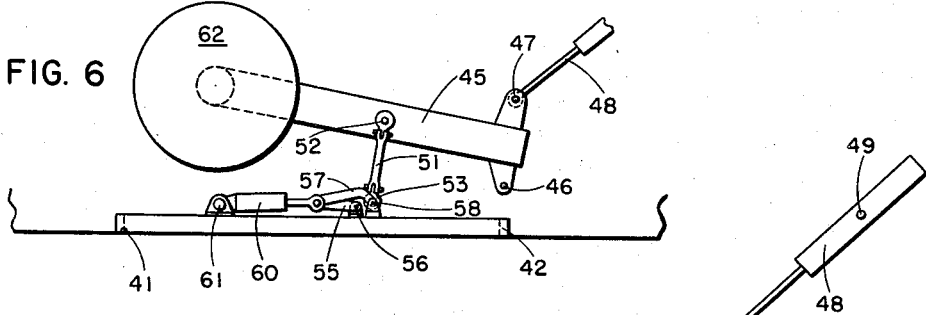
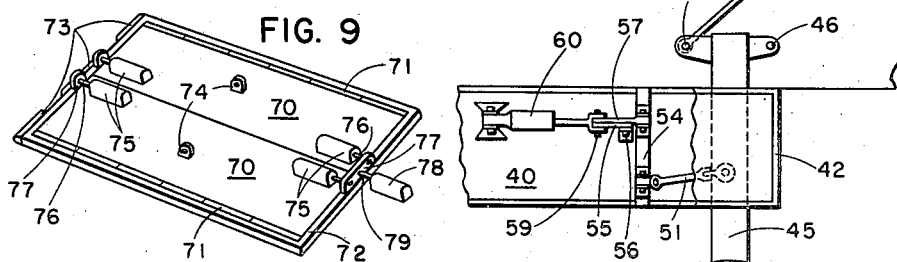
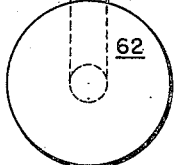
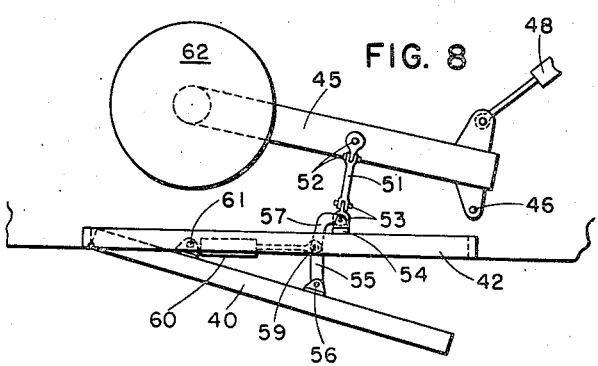
*INVENTOR.*
WALTER TYDON
BY
Richard W. Treverton
*ATTORNEY.*

Patented Apr. 10, 1951

2,548,832

UNITED STATES PATENT OFFICE 2,548,832

COMBINED LANDING GEAR DOOR AND FLUID FOIL

Walter Tydon, Granville, Ohio, assignor to Curtiss-Wright Corporation, a corporation of Delaware Application September 17, 1948, Serial No. 49,678

12 Claims. (Cl. 244—101)

The present invention relates to a combination landing gear door and fluid foil for airplanes and to operating means for the combination device.

Land based airplanes are apt to nose over or cartwheel with disastrous results when making emergency landings on water due to a portion of the airplane forward of its center of gravity dipping into the water while the forward velocity is still high. To obviate this condition it has heretofore been proposed to provide a fluid foil, usually referred to as a hydroflap, on the under surface of the airframe forward of the center of gravity, the foil being so designed as to plane on the surface of the water and thereby prevent the nose of the airplane from submerging until the forward velocity has been largely dissipated.

The present invention contemplates a panel hinged to the airplane to function as such a hydroflap and also to function as a door for closing the well or pocket in the airplane into which the landing gear is retracted during flight. By arranging the panel to perform these dual functions a substantial saving in weight may be effected.

The invention further contemplates operating means for the panel connected with the landing gear operating mechanism so that the panel may be automatically opened and closed as the landing gear is respectively projected and retracted; and other means whereby the panel may be swung into operative position as a hydroflap without movement of the landing gear from its retracted position.

When functioning as a hydroflap the panel should incline downwardly from its leading edge to its trailing edge, and accordingly it is preferably hinged at its leading edge to supporting structure on the airplane. In some instances the panel may swing about this same transverse axis in its capacity as a door for the landing gear well. In other instances, as for example when the landing gear door must be very wide, it is desirable in order to minimize the aerodynamic drag of the fully opened door, to have it hinged on an axis extending longitudinally of the airplane.

Accordingly, it is a further objective of the present invention to provide an arrangement wherein one or preferably two panels are hinged to move about a transverse hinge axis to the position in which they function as a hydroflap, and also wherein each panel moves about a longitudinal axis in its capacity as a landing gear door. To accomplish this objective each panel is hinged upon a first axis to a support which in turn is hinged to the airframe upon a second axis that is perpendicular to the first axis. In its capacity as a landing gear door the panel is caused to move about one of these two axes as the landing gear moves between its projected and retracted positions while in its capacity as a hydroflap it is moved by other operating means about the other one of the two axes.

The foregoing and other objects and advantages will become apparent from the following descriptions of the several embodiments of the invention illustrated in the drawings wherein:

Figure 1 is a perspective view of an airplane in flight and with the panel of the present invention in the position in which it functions as a hydroflap;

Figure 2 is a side elevational view showing the landing gear and panel, and also the operating mechanism therefor, in the projected position of the landing gear;

Figures 3 and 4 are views similar to Figure 2, but showing the parts respectively in the retracted position of the landing gear and in the operative or extended position of the hydroflap;

Figure 5 is a plan view showing an alternate form of the invention in which each of a pair of closure panels is mounted for movement about two different axes;

Figure 6 is a side elevation of the structure shown in Figure 5 with the panels in closed position;

Figure 7 and 8 are views similar to Figure 6 but with the panels in their full open position and in their hydroflap position, respectively; and Figure 9 is a perspective view showing another alternate form of the invention.

The airplane shown in Figure 1 has a tricycle landing gear including main landing wheels which retract into wells which are provided in nacelles 10 and which are closed by doors 11. The landing gear further includes a nose gear which is retractable into a well 12 in the fuselage at a location forward of the center of gravity of the airplane. The well 12 is normally closed when the nose gear is retracted by auxiliary doors 13 hinged to the airframe at opposite sides of the well and by a main panel 14 which is hinged at 15 along its forward edge.

As shown in Figures 2, 3 and 4, the nose landing gear includes a wheel 16 mounted upon a shock strut 17 that is pivoted to the airframe at 18 for movement between the projected or landing position shown in Figure 2 and the retracted position shown in Figures 3 and 4. The gear is moved between these two positions by an actuator which may comprise a hydraulic motor 19 of the cylinder and piston type pivoted at 20 to the airframe and having its piston rod connected at 21 to a folding brace consisting of links 22 and 23. Link 22 is pivoted to the airplane at 24 and link 23 to the strut 17 at 25, in such manner that as the piston rod of the motor is extended the brace 22, 23 is straightened to the position shown in Figure 2, projecting the nose gear from well 12; and as the piston rod is retracted the brace is folded, drawing the gear into its retracted position within the well shown in Figures 2 and 3.

For operating the panel 14 as a landing gear door a toggle is provided which comprises links 26 and 27 connected at 28. Link 26 is pivoted to the strut 17 at 25 and link 27 to the panel 14 at 29. For operating the panel as a hydroflap a motor shown as comprising a cylinder and piston unit 30 is provided. The unit 30 is pivotally supported at one end as indicated at 15, and its piston rod is connected at 21 to one of the toggle links 27.

The unit 30 normally is in its contracted position in which the link 27 is held against the panel 14 as shown in Figures 2 and 3 so that pivot 28 is held in fixed relation to the panel. Accordingly as the actuator 19 moves the gear 16, 17 between its projected and retracted positions it simultaneously acts through link 26 to move the panel between the open position thereof shown in Figure 2 and the closed position shown in Figure 3. When the gear is retracted the panel may be moved to the position in which it constitutes a hydroflap by straightening of the toggle 26, 27 which is accomplished by extension of unit 30, as shown in Figure 4.

The auxiliary doors 13 may be operated between opened and closed positions by any suitable means, either dependently or independently of operation of the landing gear. However these means are not a part of the present invention and hence are not illustrated.

While the panel 14 (and its counterparts hereinafter described) is designed primarily to function as a hydroflap in the position thereof shown in Figures 1 and 4, it will be understood that it may also serve or be designed to serve primarily as an airfoil for air braking or other aerodynamic functions; and accordingly it is sometimes referred to herein by the generic term "fluid foil."

In the form of the invention shown in Figures 5 to 8 a pair of panels 40 are hinged as indicated at 41, at their forward edges, to a pair of supports 42 which in turn are hinged at 43 to portions of the airframe 44 at opposite sides of the well for the nose gear. In the illustrated embodiment the supports 42 each constitute a frame extending around the periphery of one of the panels 40 when the latter is in closed position. The landing gear comprises a shock strut 45 pivoted to the airframe at 46 and at 47 to a cylinder and piston type of actuator designated 48, the latter being pivoted to the airframe at 49.

The panels 40 are connected to the actuator 48 through the intermediary of landing gear strut 45. The connections include a link 51 for each panel 40 universally pivoted at 52 to the strut and at 53 to a rail 54 which constitutes a part of support 42 and which extends across the latter in overlying relationship to the panel.

Each support 42 is connected to its related panel 40 by a toggle including a link 55 pivoted at 56 to the panel and a link 57 pivoted at 58 to bar 54. The knee pivot 59 of the toggle connects to one end of an extensible actuator 60 which is connected at its opposite end to the panel as indicated at 61.

In operation of the landing gear shown in Figures 5 to 8 the strut 45 is operated about pivot 46 by extension and contraction of actuator 48 to carry the dual landing wheel 62 between the retracted position thereof shown in Figures 5 and 6 and the projected or landing position depicted in Figure 7. During this movement the actuators 60 are contracted and hold the toggles 56, 57 folded so that each panel 40 is constrained against movement relative to its support 42 and is moved as a unit with the latter, by the link 51. This movement is about the axes of hinges 43 between the landing gear well closing position shown in Figures 5 and 6 and the open position shown in Figure 7. When the gear is in retracted position the panels may be moved about the axis of hinges 41 to the position shown in Figure 8 by extension of actuators 60 and the resulting straightening of the toggles 56, 57. During such action the actuator 48, or such other suitable means as may be provided for holding the gear retracted, acts with links 51 as means for restraining the support 42 against movement about the axes of hinges 43.

It will be noted that when the panels 40 are in this position in which they can act as a fluid foil the toggle 55, 57 is in substantially full extended or straightened position so that loads on the panel are transmitted to the gear 45, 46, 48 and need not be borne to any substantial degree by the actuators 60. The same of course is true of the load on actuator 30 in Figures 2 to 4 when toggle 26, 27 is straightened.

The form of the invention shown in Figure 9 differs from that of Figures 5 to 8 in that the panels, designated 70, are pivoted on longitudinal hinge axes rather than on a transverse hinge axis to the support and the latter is hinged to the airframe on a transverse axis rather than on longitudinal axes. As shown the two panels are connected by hinges 71 to a support 72 which is illustrated as being a rectangular frame extending around the periphery of the panels when the latter are in closed position. The support 72 is hinged at 73 on a transverse axis to the airframe at the forward end of the wheel well. To actuate the panels between their several positions they are connected at 74 to suitable means, such as the links 51 shown in Figures 5 to 8. To determine which hinge axis each panel will swing about upon extension of the actuating means, locking means are provided. These include locks 75 on the panels having retractable pins 76 for locking engagement with keepers 77 carried by support 72 and another locking device, 78, carried by the airframe and having a pin 79 retractably engaging keeper 77 to hold the support 72 against movement about hinge 73. In operation, when the gear is to be lowered to landing position the locks 75 are released and lock 78 is applied so that the actuating means acting downwardly on connection points 74 swing the panels about the axes of hinges 71 to an open position corresponding to the open position of panels 40 in Figure 7. When, however, the panels are to be used as a hydroflap or other fluid foil the locks 75 are applied and lock 78 is released, so that a partial extension of the landing gear actuator will cause the panels 70 to move as a unit with support 72 to a position corresponding to that of panels 40 in Figure 8. This form of the invention while employing locking means 75, 78 does not require panel actuators such as 30 in Figures 1 to 4 and 60 in Figures 5 to 8, since the landing gear actuator also serves for this purpose.

It will be understood that the locking means 75, 78 and also the actuators 19, 30, 49 and 60 may be of any suitable kind, operating either by fluid pressure, or by electricity or by mechanical means through any suitable control means. The details of such actuators and their controls are well known in the art and form no part of the present invention.

It will also be understood that the forms of the invention shown and described herein are merely illustrative of the inventive principles involved, and that these principles may be embodied in various other forms without departing from the spirit of my invention or from the scope of the appended claims.

I claim as my invention:

1. In combination with an airplane having a landing gear retractable into a well in the airframe forwardly of the airplane's center of gravity; a panel movably connected to the airframe to move between a first position wherein it serves as a closure for said well, a second position in which it uncovers the well to provide for projection and retraction of the gear, and a third position in which it constitutes a hydroflap; actuating means for operating the landing gear between its retracted and projected positions; means operable by and upon operation of said actuating means for moving the panel between said first and second positions; and other means operable to move said panel from said first position to said third position while said landing gear remains in retracted position.

2. In combination with an airplane having a landing gear retractable into a well in the airframe; a panel movably connected to the airframe to move between a first position wherein it serves as a closure for said well, a second position in which it uncovers the well to provide for projection and retraction of the gear, and a third position in which it constitutes a fluid foil; actuating means for operating the landing gear between its retracted and projected positions; a connection between said actuating means and said panel for moving the panel from said first position to said second position when the gear is extended and from said second position to said first position when the gear is retracted; and means for operating said connection to move said panel from said first to said third positions, the last mentioned means being operable independently of movement of said actuating means and said gear.

3. In combination with an airplane having a landing gear retractable into a well in the airframe; a panel movably connected to the airframe to move between a first position wherein it serves as a closure for said well, a second position in which it uncovers the well to provide for projection and retraction of the gear, and a third position in which it constitutes a fluid foil; an actuator for operating the landing gear between its retracted and projected positions; means operable by and upon projection and retraction of the gear for moving the panel between said first and second positions; and other means operable to move said panel from said first to said third positions, said other means being operable independently of movement of the gear.

4. In combination with an airplane having a landing gear retractable into a well in the airframe; a panel movably connected to the airframe to move between a first position wherein it serves as a closure for said well, a second position in which it uncovers the well to provide for projection and retraction of the gear, and a third position in which it constitutes a fluid foil; actuating means for operating the landing gear between its retracted and projected positions; a connection between the actuating means and the panel for moving the latter between said first and second positions, said connection including a toggle extensible to move said panel from said first to said third positions without operation of said actuating means; and a second actuator for extending said toggle.

5. In combination with an airplane having a landing gear retractable into a well in the airframe; a panel movably connected to the airframe to move between a first position wherein it serves as a closure for said well, a second position in which it uncovers the well to provide for projection and retractions of the gear, and a third position in which it constitutes a fluid foil; actuating means for operating the landing gear between its retracted and projected positions; a connection between the landing gear and the panel for moving the panel between said first and second positions, said connection including a toggle extensible to move said panel from said first to said third positions while said landing gear remains in retracted position; and a second actuator for extending said toggle.

6. In combination with an airplane having a landing gear retractable into a well in the airframe forwardly of the airplane's center of gravity; a panel and a support therefor, the panel being pivoted to the support upon a first axis and the support being pivoted to the airframe on a second axis, one of said axes being a transverse axis at the forward end of the well and the other axis being a longitudinal axis at a side of the well, and motor means operatively connected to said panel selectively operable for moving said panel about said longitudinal axis between a first position wherein said panel serves as a closure for said well and a second position wherein said panel uncovers said well to provide for projection of the landing gear, said motor means also being selectively operable for moving said panel about said transverse axis between said first position and a third position wherein said panel inclines downwardly toward its trailing edge to constitute a fluid foil.

7. In combination with an airplane having a landing gear retractable into a well in the airframe forwardly of the airplane's center of gravity; a panel and a support therefor, the panel being pivoted to the support upon a first axis and the support being pivoted to the airframe on a second axis, one of said axes being a transverse axis at the forward end of the well and the other axis being a longitudinal axis at a side of the well, whereby the panel may move about the longitudinal axis between a first position wherein it serves as a closure for said well and a second position wherein it uncovers said well to provide for the projection of the landing gear and may move about said transverse axis between said first position and a third position wherein it inclines downwardly toward its trailing edge to constitute a fluid foil; and actuating means for operating said landing gear and said panel, said actuating means including means for constraining the panel against movement about said transverse axis and for causing it to move about said longitudinal axis to said second position when the landing gear is moved to the projected position thereof, and said actuating means further including means for constraining said panel against movement about said longitudinal axis during movement of the panel from said first position to said third position.

8. In combination with an airplane having a landing gear retractable into a well in the airframe forwardly of the airplane's center of gravity; a panel and a support therefor, the panel being pivoted to the support upon a transverse axis at one end of the well and the support being pivoted to the airframe on a longitudinal axis at one side of the well, whereby the panel may move about the longitudinal axis between a first position wherein it serves as a closure for said well and a second position wherein it uncovers said well to provide for the projection of the landing gear, and may move about said transverse axis between said first position and a third position wherein it inclines downwardly toward its trailing edge to constitute a fluid foil; a first actuator for operating said landing gear; a connection between said actuating means and the support for moving the latter and the panel as a unit between said first and second positions, and for constraining the support against movement when the panel is being moved between said first and third positions; a toggle connected between the support and the panel; and a second actuator for extending said toggle to move the panel relative to the support between said first and third positions, said second actuator constraining said panel against movement relative to the support when the panel is being moved between said first position and said second position.

9. In combination with an airplane having a landing gear retractable into a well in the airframe forwardly of the airplane's center of gravity; a panel and a support therefor, the panel being pivoted to the support upon a transverse axis at one end of the well and the support being pivoted to the airframe on a longitudinal axis at one side of the well, whereby the panel may move about the longituditudinal axis between a first position wherein it serves as a closure for said well and a second position wherein it uncovers said well to provide for the projection of the landing gear, and may move about said transverse axis between said first position and a third position wherein it inclines downwardly toward its trailing edge to constitute a fluid foil; a first actuator for operating said landing gear; a connection between said actuating means and the support for moving the latter and the panel as a unit between said first and second positions; an extensible connection between the frame and the panel; and a second actuator for extending said connection to move the panel relative to the support between said first and third positions.

10. In combination with an airplane having a landing gear retractable into a well in the airframe forwardly of the airplane's center of gravity; a panel and a support therefor, the panel being pivoted to the support upon a transverse axis at one end of the well and the support being pivoted to the airframe on a longitudinal axis at one side of the well, whereby the panel may move about the longitudinal axis between a first position wherein it serves as a closure for said well and a second position wherein it uncovers said well to provide for the projection of the landing gear, and may move about said transverse axis between said first position and a third position wherein it inclines downwardly toward its trailing edge to constitute a fluid foil; an actuator for operating said landing gear; a connection between said actuating means and the support for moving the latter and the panel as a unit between said first and second positions; and means operable independently of said actuator to move the panel relative to the support between said first and third positions.

11. In combination with an airplane having a landing gear retractable into a well in the airframe forwardly of the airplane's center of gravity; a pair of panels and a support for each panel, each panel being pivoted to its support upon a transverse axis at one end of the well and the supports being pivoted to the airframe on longitudinal axes at opposite sides of the well, whereby the panels may move about said longitudinal axes between a first position wherein they serve as a closure for said well and a second position wherein they uncover said well to provide for the projection of the landing gear, and may move about said transverse axis between said first position and a third position wherein they incline downwardly toward their trailing edges to constitute a fluid foil; a first actuator for operating said landing gear; connections between said actuating means and the supports for moving the latter and their respective panels as units between said first and second positions, and for constraining the supports against movement when the panels are being moved between said first and third positions; a toggle connected between each support and the related panel, and an actuator for each panel extending the related toggle to move the panel relative to its support between said first and third positions, the last mentioned actuators constraining the panels against movement relative to their supports when the panels are being moved between said first position and said second position.

12. In combination with an airplane having a landing gear retractable into a well in the airframe forwardly of the airplane's center of gravity; a panel and a support therefor, the panel being pivoted to the support upon a transverse axis at one end of the well and the support being pivoted to the airframe on a longitudinal axis at one side of the well, and motor means operatively connected to said panel selectively operable for moving said panel about said longitudinal axis between a first position wherein said panel serves as a closure for said well and a second position wherein said panel uncovers said well to provide for projection of the landing gear, said motor means also being selectively operable for moving said panel about said transverse axis between said first position and a third position wherein said panel inclines downwardly toward its trailing edge to constitute a fluid foil.

WALTER TYDON.

REFERENCES CITED

The following references are of record in the file of this patent:

UNITED STATES PATENTS

| Number | Name | Date |
| --- | --- | --- |
| 2,110,865 | Burgess | Mar. 15, 1938 |
| 2,196,946 | Stone | Apr. 9, 1940 |
| 2,383,870 | Ludington | Aug. 28, 1945 |
| 2,460,677 | Cervellone | Feb. 1, 1949 |